(12) United States Patent
Abdo et al.

(10) Patent No.: US 9,071,843 B2
(45) Date of Patent: Jun. 30, 2015

(54) RDP BITMAP HASH ACCELERATION USING SIMD INSTRUCTIONS

(75) Inventors: Nadim Y. Abdo, Redmond, WA (US); Voicu Anton Albu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 596 days.

(21) Appl. No.: 12/393,950

(22) Filed: Feb. 26, 2009

(65) Prior Publication Data

US 2010/0215280 A1    Aug. 26, 2010

(51) Int. Cl.
G06Q 99/00 (2006.01)
H04N 19/423 (2014.01)
H04N 19/50 (2014.01)
G06K 9/36 (2006.01)

(52) U.S. Cl.
CPC ......... *H04N 19/423* (2014.11); *G06Q 2220/10* (2013.01); *G06K 9/36* (2013.01); *H04N 19/50* (2014.11)

(58) Field of Classification Search
CPC .............................. G06K 9/36; G06Q 2220/10
USPC ........... 361/679.03, 679.55, 679.56; 190/110; 206/576, 320, 769, 771; 705/50; 726/26; 382/232
See application file for complete search history.

(56) References Cited

U.S. PATENT DOCUMENTS

| | | | |
|---|---|---|---|
| 4,868,877 A * | 9/1989 | Fischer | 713/157 |
| 6,075,938 A | 6/2000 | Bugnion | |
| 6,377,688 B1 * | 4/2002 | Numao | 380/30 |
| 6,437,803 B1 * | 8/2002 | Panasyuk et al. | 715/733 |
| 7,027,143 B1 | 4/2006 | Stokowski et al. | |
| 7,080,404 B2 * | 7/2006 | Abdo et al. | 726/3 |
| 7,143,294 B1 | 11/2006 | Johnson | |

(Continued)

FOREIGN PATENT DOCUMENTS

| | | |
|---|---|---|
| CN | 1630246 A | 6/2005 |
| CN | 1694058 A | 11/2005 |

(Continued)

OTHER PUBLICATIONS

Govi et al., Cellular Disco: Resource Management Using Virtual Clusters on Shared-Memory Multiprocessors, Operating Systems Review, Dec. 1999, 34(5), p. 154-169 http://citeseerx.ist.psu.edu/viewdoc/download?doi=10.1.1.33.6713&rep=rep1&type=pdf.

(Continued)

*Primary Examiner* — James D Nigh
(74) *Attorney, Agent, or Firm* — Bryan Webster; Kate Drakos; Micky Minhas (57) ABSTRACT

Systems, methods and computer readable media are disclosed for a vectorized tile differencing algorithm for a remote desktop protocol (RDP). A server executes a CBC-variant vectorized hash algorithm that is used to produce a big key that identifies the tile, and keeps track of these big keys. Where a serial version of the algorithm operates on a single portion of the image at once—such as 32 bits—the vectorized algorithm operates on a plurality of these portions simultaneously. Where the server identifies that a tile has already been sent to a client via RDP because it has a second big key that matches the big key, it sends the big key to the client—which caches received tiles—and the client uses it to access the proper tile for display. Where the server identifies that a tile has not already been sent to the client, it sends the client the tile.

20 Claims, 3 Drawing Sheets

(56) References Cited

U.S. PATENT DOCUMENTS

| | | | |
|---|---|---|---|
| 7,353,382 B2* | 4/2008 | Labrou et al. | 713/155 |
| 7,353,388 B1* | 4/2008 | Gilman et al. | 713/168 |
| 7,434,002 B1 | 10/2008 | Zedlewski | |
| 7,672,005 B1* | 3/2010 | Hobbs et al. | |
| 7,822,278 B1* | 10/2010 | Hobbs et al. | 382/232 |
| 7,979,707 B2* | 7/2011 | Rostin et al. | 713/171 |
| 2003/0188195 A1* | 10/2003 | Abdo et al. | 713/169 |
| 2004/0030894 A1* | 2/2004 | Labrou et al. | 713/168 |
| 2005/0044046 A1 | 2/2005 | Ishiguro | |
| 2005/0160272 A1* | 7/2005 | Teppler | 713/178 |
| 2006/0004808 A1 | 1/2006 | Hsu et al. | |
| 2006/0005031 A1 | 1/2006 | Apostolopoulos | |
| 2006/0177056 A1* | 8/2006 | Rostin et al. | 380/46 |
| 2007/0067604 A1 | 3/2007 | Elnozahy | |
| 2007/0085825 A1* | 4/2007 | Geffin et al. | 345/157 |
| 2007/0124474 A1* | 5/2007 | Margulis | 709/226 |
| 2008/0002894 A1* | 1/2008 | Hayon et al. | 382/232 |
| 2008/0068483 A1 | 3/2008 | Yoshino et al. | |
| 2009/0060197 A1* | 3/2009 | Taylor et al. | 380/277 |
| 2009/0210722 A1 | 8/2009 | Russo | |
| 2009/0300363 A1* | 12/2009 | Hamalainen et al. | 713/178 |

FOREIGN PATENT DOCUMENTS

| | | |
|---|---|---|
| CN | 101014127 A | 8/2007 |
| CN | 101268674 A | 9/2008 |
| JP | H04-148372 A | 5/1992 |
| JP | 2002-251373 A | 9/2002 |
| RU | 2225027 C2 | 2/2004 |
| WO | 2005064506 A1 | 7/2005 |

OTHER PUBLICATIONS

Virtualization: State of the Art, Scope Alliance, Apr. 3, 2008, p. 1-18 http://www.scope-alliance.org/pr/SCOPE-Virtualization-StateofTheArt-Version-1.0.pdf.

Virtual Machines, EE392C Lecture # 10 Advanced Topics in Computer Architecture, May 1, 2003, p. 1-5 http://www.stanford.edu/class/ee392c/notes/lec10/notes10.pdf Gummaraju et al.

Whitaker et al. Rethinking the Design of Virtual Machine Monitors, IEEE, University of Washington, May 2005, p. 57-62 http://www.cs.washington.edu/homes/gribble/papers/IEEE_vmm.pdf.

Chapman et al., Implementing Transparent Shared Memory on Clusters Using Virtual Machines, Proceeding of the 2005 USENIX Annual Technical Conference, 2005, p. 1-9 http://www.usenix.org/event/usenix05/tech/general/full_papers/short_papers/chapman/chapman_html/.

Russinovich, M., Inside Windows Server 2008 Kernel Changes, Microsoft Corporation, 2008, p. 1-6 http://technet.microsoft.com/en-us/magazine/cc194386.aspx.

PCT Application No. PCT/US2010/023256: International Search Report and Written Opinion of the International Searching Authority, Aug. 30, 2010, 7 pages.

Notice of Allowance Issued in Australian Patent Application No. 2010218303, Mailed Date: May 15, 2014, 2 Pages.

"Office Action Issued in Russian Federation Patent Application No. 2011135548", Mailed Date: Feb. 13, 2014, 5 Pages (w/o English Translation).

"Office Action Issued in Japan Patent Application No. 2011-552058", Mailed Date: Jul. 1, 2014, 6 Pages.

"Office Action Issued in Australian Patent Application No. 2010218303", Mailed Date: Apr. 1, 2014, 3 Pages.

* cited by examiner

RDP BITMAP HASH ACCELERATION USING SIMD INSTRUCTIONS

BACKGROUND OF THE INVENTION

Although computers were once isolated and had minimal or little interaction with other computers, today's computers interact with a wide variety of other computers through communications networks, such as Local Area Networks (LANs) and Wide Area Networks (WANs). With the wide-spread growth of the INTERNET™, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the INTERNET). As such, the user has the experience as if their machine is operating as part of a LAN, when in reality the client device is only sent screenshots of the applications as they appear on the server side.

Two common techniques to send graphics data to a client are sending graphic primitives and other operations, which tell a sub-routine on the client side what and how to draw something, and sending a bitmap image to the client for display. When sequences of primitives are too complex, it may sometimes make more sense to send a bitmap representation that can more simply be displayed, rather than the potentially long sequence of other more complicated primitive operations. However, it may be too expensive to continually send full bitmap representations of the screen because of the limitations of most bit stream compressors as well as limited network bandwidth.

To alleviate these issues, a frame that is being sent to a client (such as an application window) may be subdivided into tiles. Those tiles are then cached on the client side, and when a tile is repeated between two bitmaps, rather than re-sending the client the tile, the server sends an instruction for the client to display the cached tile. This may greatly reduce the bandwidth costs of a RDP session, especially where tiles are frequently repeated. However, in doing this, processing resources must then be devoted to caching tiles.

Further, the tiling algorithm is often implemented in such a way as to maximize the chances of a cache hit. Where a tile is smaller, it has a better chance that it will be used twice (either within that frame or in a future frame). There is often a minimum useful tile size as well, because where a tile is too small, only a small benefit is received from a cache hit between two tiles.

These RDP bitmap caching algorithms and detecting of the difference between tiles ("tile differencing") are critically important to reducing the bandwidth of a RDP display stream to levels that are acceptable for transmission over a LAN, WAN or wireless local area network (wLAN). These caching algorithms typically trade-off processing time (frequently of the central processing unit (CPU)) on a server in exchange for a decreased amount of bandwidth required for that server to transmit the information to a client across a network.

One of the major processing costs of RDP bitmap caching is the hash algorithm used—an algorithm that transforms the larger image data into a smaller data that may be used as an index to a sorted data structure, such as an array or a tree. Some hashing algorithms implement a cipher block chaining (CBC) algorithm, or a variation upon a CBC algorithm. However, this processing time used on the hashing algorithm can inhibit the scalability of the server, since all available processing resources may be used by RDP sessions before any other resource—such as the server's network bandwidth— becomes exhausted. This processing time also increases the time required to encode an image frame, the rate at which these frames may be produced and sent to a client (the framerate (FPS)).

Increasing the speed of the hashing algorithm with current parallel processors is difficult, because the CBC hash algorithm is typically serial, which does not lend itself well to parallel processing, such as on a single instruction, multiple data (SIMD) processor.

There exist a class of processors known as vector processors that have SIMD instructions in their instruction set architecture (ISA). Streaming SIMD extensions (SSE) such as the SSE 4.2 instructions in some INTEL™ x86 ISA processors, like the NEHALEM™ processor are a form of these SIMD instructions. These processors are able to speed up processing of certain types of data because they can operate on a large chunk of data at once. For instance, where an image is being processed, instead of operating on a single pixel at a time, a SIMD processor may operate on several pixels in parallel with a single instruction. Not only does this improve the performance of processing the instruction itself, but it may decrease the time spent fetching data from memory.

While SIMD instructions offer opportunities for improving the performance of some types of processes, such as processing image data for compression, the algorithms and techniques required to implement the process are considerably more difficult than with a non-vector processor. Special attention must be paid to data flow, and to organizing data in such a manner that it may be operated on in parallel. To that end, there would be a benefit from new techniques to increase the parallelism in hashing operations on RDP tiles.

SUMMARY OF THE INVENTION

The present techniques for acceleration make use of parallel processing by computing the hash algorithm in parallel on a multiple of bits as the serial algorithm operates, and then combining these separately computed hashes to determine a hash for the image. This produces a large reduction in CPU time required for processing, without increasing the collision hit rate—the rate at which two different inputs to a hash algorithm will produce the same output—only a small amount. In many RDP the hashing situations, this minor increase in the collision hit rate is acceptable.

The present techniques are useful in scenarios beyond RDP tile classification, so long as they may benefit from an increase in hashing speed while accepting some increase in the collision hit rate. This collision hit rate increase is very minor, approximately $(100/2^{192})\%$.

In example embodiments of the present disclosure, a method, system and computer readable storage medium are provided for RDP bitmap hash algorithm acceleration using SIMD instructions.

The present techniques offer a significant gain for RDP in two cases. First, a CBC hash algorithm or CBC-type hash algorithm may be used to compute a hash of a bitmap tile. If the bitmap tile is encountered again, the hash function will produce the same cache keys and the server can save bandwidth by avoiding resending the bitmap.

Second, in the case where RDP is running using pure screen scraping (extracting the image data from the display output of another program), this same hash function may used to compute hashes of the image tiles on each new frame to perform a quick comparison of which tiles have changed frame to frame.

Both of these cases mean that the hash function is typically one of the highest CPU costs of the RDP stack and since RDP is in some cases CPU limited, reducing CPU cost may allow one to increase the throughput of RDP.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for hash acceleration in accordance with this specification are further described with reference to the accompanying drawings in which.

DETAILED DESCRIPTION OF ILLUSTRATIVE EMBODIMENTS

Figure 1:
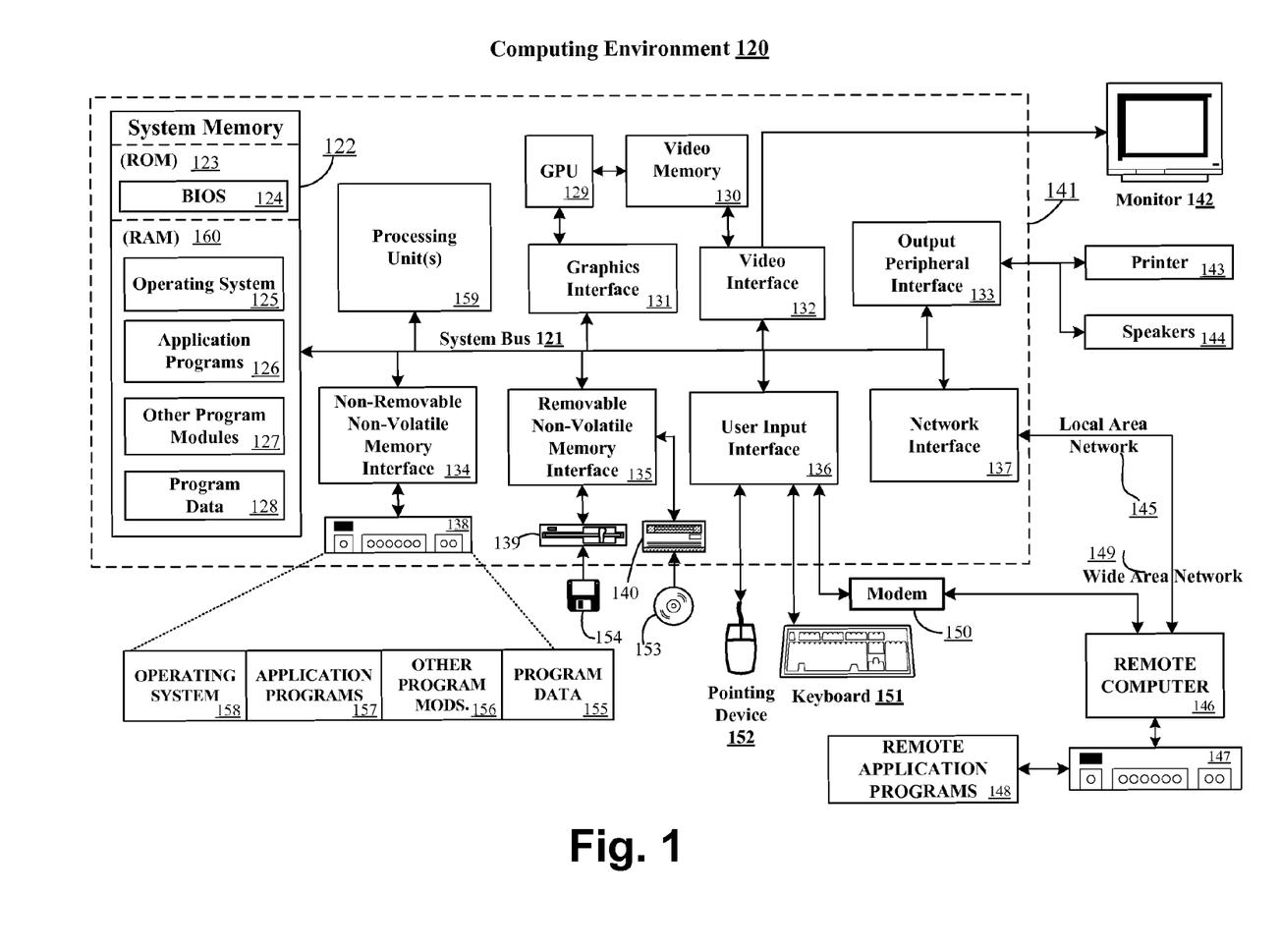
FIG. 1 illustrates an exemplary general purpose computing environment in which in which the hash acceleration described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer readable media. Computer readable media can be any available media that can be accessed by computer 141 and includes both volatile and nonvolatile media, removable and non-removable media. The system memory 122 includes computer storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

Figure 2:
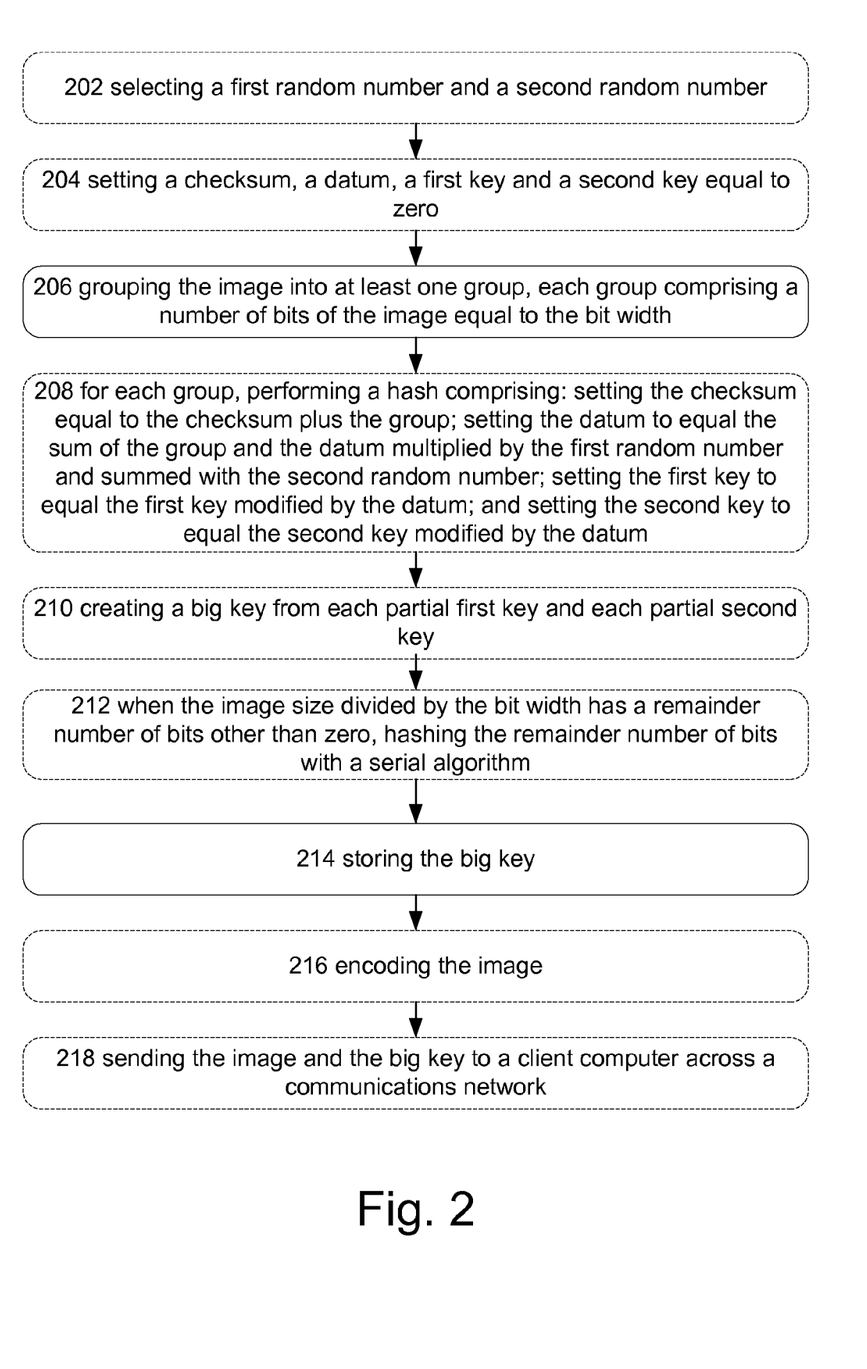
FIG. 2 illustrates exemplary operational procedures for hash acceleration.

FIG. 2 depicts exemplary operational procedures for hash acceleration. A serial hashing process may take one DWORD (double word; in many system architectures this is 32 bits) of image data at a time, starting at the front of the image and working to the back. It will compute one key for the image, which is updated based on each new DWORD of the image that is processed. In contrast, the present exemplary operating procedures operate on a plurality of DWORDS at a time. In an embodiment where a DWORD comprises 32 bits and the processor may operate upon 128 bits simultaneously, this may be four DWORDS of data. The procedures keep four partial keys for the image—one corresponding to each DWORD operated upon in parallel—and those four partial keys may be combined once all of the image has been processed to produce a final key.

Optional operation 202 depicts selecting a first random number and a second random number, the first random number differing from the second random number.

Optional operation 204 depicts setting each of a checksum, a datum, a first key and a second key equal to zero. In any embodiment, the checksum, datum, first key and second key equal zero before the present operations begin, so it is not necessary to set them to zero at this point. Where the techniques use these four numbers to keep running sums, they may be initialized by setting them to zero. The checksum and the datum may be used as internal variables that are used to determine the first key and the second key. The first key and the second key may comprise a big key for an image, the big key later used to look up the image or a reference thereto, such as for a server to look up whether it has sent a client the image, or for the client that receives the big key in lieu of an image it has already received, to look up the image itself. It is faster to calculate the big key as these two components—the first key and the second key—and then combine them than it is to calculate a monolithic big key.

Operation 206 depicts grouping the image into at least one group, each group comprising a number of bits of the image equal to the bit width. A processor may operate on more than one bit of data at a time. For instance, a 128-bit processor may operate on 128 bits of data at a time. This processor then has a "bit width" of 128 bits. Those 128 bits need not belong to the same data structure, such as one that represent a 128-bit number. Rather, that 128 bits may comprise multiple pieces of data, such as four discrete 32 bit-integers, or eight discrete 16-bit integers. In such a situation, instructions exist such that when an operation is performed on a group of four 32-bit integers, the result of that operation (such as a multiple, or a logical shift) does not overflow into an adjoining integer in the 128 bits.

In an embodiment, the image comprises a screen scrape. A screen scrape comprises taking data from the display output of another program. Since this data was intended by the other program to be displayed on an output device, it typically lacks documentation or structure to aid in parsing it.

In an embodiment, the image comprises a tile in a Remote Desktop Protocol (RDP), the tile comprising a bitmap. A tile may comprise a subset of a frame, a frame typically comprising an application window. In a typical embodiment, a frame is divided into a plurality of rectangular tiles, and only those tiles that have changed need to be sent to the client.

In an embodiment, where the image is unaligned on an alignment boundary, the first bits of the image prior to the first bit boundary are hashed with a serial cipher block chaining (CBC) algorithm to produce a pre-first key and a pre-second key. For instance, where the present operations operate on 128 bits in parallel, and the image is unaligned on a 128-bit boundary, with 56 bits of the image occurring before the first 128-bit boundary in the image, those 56 bits are hashed with a serial CBC algorithm, and the resulting pre-first key and pre-second key are combined with the resulting first key and second key, respectively, of the following operations via a serial CBC algorithm.

Operation 208 depicts, for each group, performing a hash comprising: setting the checksum equal to the checksum plus the group; setting the datum to equal the sum of the group and the datum multiplied by the first random number and summed with the second random number; setting the first key to equal the first key modified by the datum; and setting the second key to equal the second key modified by the datum. In embodiments, performing a hash comprises: calculating a running reference to the image, the running reference comprising the checksum, the first key, the second key, and the datum, and calculated based on the running reference, the group, the datum, the first random number and the second random number.

In an embodiment, the first key is modified by the datum by performing an exclusive-or operation on the first key and the datum, and the second key is modified by the datum by performing an exclusive-or operation on the second key and the datum. An exclusive or is a bitwise operation where the result of the two inputs is 1 where one and only one of the inputs is also a 1. For instance, where "^" denotes the exclusive OR operation, $0^\wedge 0=0$, $0^\wedge 1=1$, $1^\wedge 0=1$, and $1^\wedge 1=0$.

The image may be thought of as having a start and an end, and in an embodiment, the operations performed for each group are first performed for the group nearest to the start for which the operations performed for each group have not already been performed. That is, the technique proceeds sequentially through the image, taking one group of bits at a time and processing it before doing the same for the next group of bits, until the end of the image is reached.

In an embodiment, the hash comprises a cipher block chaining (CBC) hash.

Optional operation 210 depicts setting a DWORD first key based on each DWORD size of bits of the first key; and setting a DWORD second key based on each DWORD size of bits of the second key.

Where the first key and the second key each comprise fewer bits than the bit width of the processor, partial keys are calculated. When all of the image has been processed, these partial keys are then used to determine the full first key and the second key. Take the embodiment where the first key and the second key each comprise 32 bits and the bit width is 128 bits. In this embodiment, 128 bits of the image are processed simultaneously, producing four 32-bit partial first keys and four 32-bit partial second keys. When the entire image has been processed, then each of those four partial keys is used to determine the full key, or DWORD first key and DWORD second key.

In an embodiment, the four partial first keys are used to determine the DWORD first key by exclusive-or'ing (XOR-ing) them together. Where the four partial first keys are expressed as Key1[0], Key1[1], Key1[2], and Key1[3], this operation may logically be expressed as Key1[0]^Key1[1]^Key1[2]^Key1[3].

In an embodiment, the four partial first keys are used to determine the DWORD first key by combining them using a serial CBC hash algorithm. In an embodiment, Key1[0] is CBC hashed with Key1[1], the result of which is CBC hashed with Key1[2], the result of which is CBC hashed with Key1[3].

Optional operation 212 depicts, when the image size divided by the bit width has a remainder number of bits other than zero, hashing the remainder number of bits with a serial algorithm to produce a post-first key and a post-second key, determining the first key based on the post first-key, and determining the second key based on the post-second key. Where the image has a number of bits that is evenly divisible by the bit width, a series of parallel operations as described in the above operations may take place on every bit of the image. However, where the image has a number of bits that is not evenly divisible by the bit width, a conventional serial hashing of those final bits may take place, as opposed to the above parallel hashing. The resulting post-first key and post-second key may be combined with the first key and the second key, such as by setting the first key to the result of performing a serial CBC hash on the first key and the post-first key, and by setting the second key to the result of performing a serial CBC hash on the second key and the post-second key.

In an embodiment, the image has an end, and no part of the image is nearer the end than the remainder number of bits. That is, the remainder bits will be considered to be the final bits of the image, and they shall be processed in serial fashion after all proceeding bits have been processed in parallel fashion, a bit width number of bits at a time.

In an embodiment, the first key and the second key that are calculated from this serial processing are combined with the first key and the second key calculated from the above parallel processing, such as through a serial CBC hash of the respective first keys, as well as a serial CBC hash of the respective second keys.

Operation 214 depicts storing a big key comprising the first key and the second key in a big key store. Once hashed, the image may be stored at a memory address and in a data structure, such as a tree, and the datum is then used to access the image at the location of the memory address. For instance, where an array memory structure is used, the datum may serve as an index to that array, and the image is stored at the datum-index of the array.

Where each key comprises 32 bits, the big key comprises 64 bits, so there exist $2^{64}$ possible values for a big key. In an embodiment, while the possibility of a collision (two different image tiles correspond to the same big key) the odds of that occurring are so small (approximately 1 in $2^{64}$ as between any two big keys) that the processing resources required to detect collisions greatly outweigh the benefit of detecting one and identifying the correct tile image that collisions are ignored and an incorrect image may be used.

Operation 216 depicts encoding the image. In an embodiment, this comprises encoding the image via run-length encoding (RLE). In an embodiment, this may comprise encoding different portions of the image with different codecs. For instance, where part of the image must be displayed in lossless quality, such as if it is a medical x-ray used by a physician, it may be encoded with a lossless codec. Another part of the image may be black text on a white background, and encoding it with a RLE algorithm would reduce its space by the most amount (as well as be lossless). In this case, these two codecs may be used on the appropriate parts of the image. In an embodiment, the color channels of the image are separated—a RGBA image is separated into its individual red (R), green (G), blue (B) and alpha (A) color channels, and each of those channels is separately encoded.

Operation 218 depicts sending the image to a client computer across a communications network. This is not necessary where the image has already been sent to the client, and the client caches images that it has received. In this case, the client may be sent the big key. The client may maintain a hash table of received images similar to the hash table maintained by the apparatus performing the present operations. In this situation, when it receives the big key, the client may use the big key as an index to its hash structure, receive the corresponding image, and process that image as it would if it had received the image rather than the datum.

Figure 3:
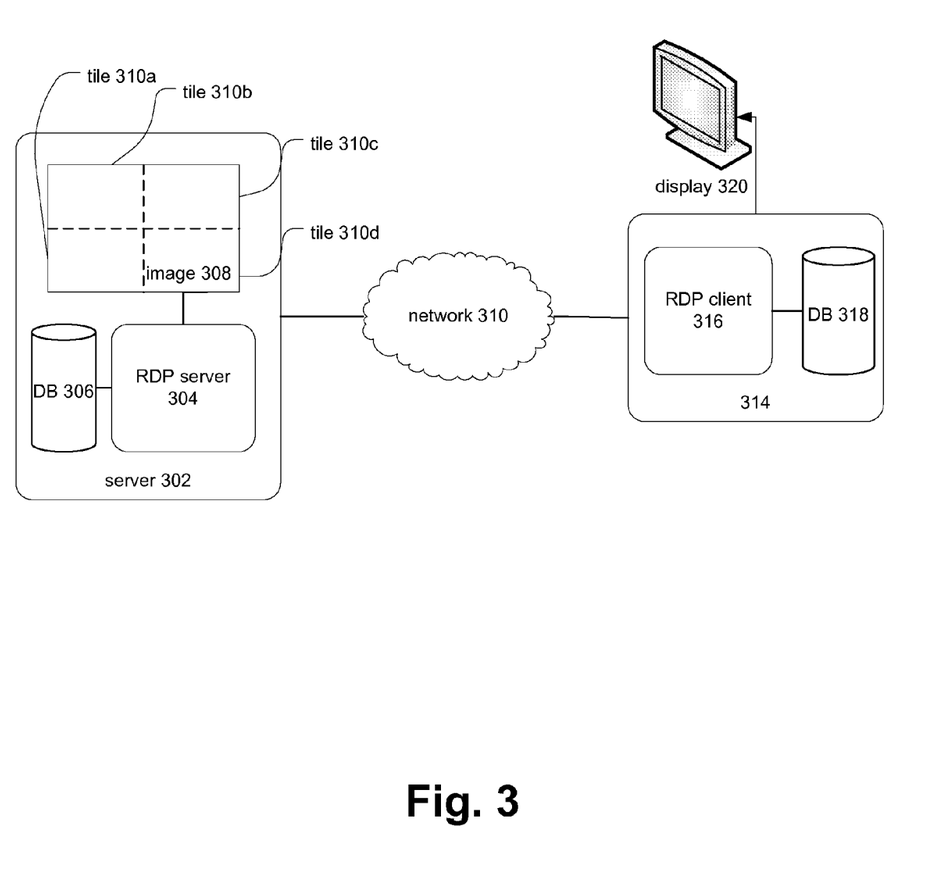
FIG. 3 illustrates a client and server communicating via a remote desktop protocol (RDP) that utilizes the above accelerated tile differencing techniques.

FIG. 3 illustrates a client and server communicating via a remote desktop protocol (RDP) that utilizes the above accelerated tile differencing techniques. A server 302 comprises a RDP server 304, a key database 306, and at least one bitmap image 308. The image 308 is divided into at least one tile 310, each tile comprising a bitmap. The server 302 communicates with a client 314 across a communications network 312. The client 314 comprises a RDP client 316, and a tile database 318, and is connected to a display device 320.

In a RDP session between the client 314 and the server 302, the server sends the client image information across the network 312, corresponding to processing that the server 302 is executing. For instance, the client 314 may have a RDP session where it executes a text editor on the server. The client 314 sends commands to the server 302, such as inputting a series of characters into the text editor at the current editing position, or opening a new file. Those commands are processed on the server 302, and the resulting display output is sent back to the client 314 for display on display device 320. In such an embodiment, the image 308 may comprise the text editor's application window at a given point in time. If the user is adding new text near the bottom of the application window, then the top portion of the application window may not change in the near future. So, the image 308 may be divided into tiles 310, and as a plurality of images 308 is sent to the client 314 over time, each image 308 sent as a plurality of tiles 310, only those tiles 310 that are different from all preceding tiles 310 need be sent. The client 314 may cache previously received tiles 310 in a tile cache 318, and where a tile 310 is repeated, the server 302 may send the client 314 an indication of that tile rather than the tile 308 itself. That first tile that is now cached in the tile cache 318 need not be in the same location as the repeated tile. For instance, with a new document in a text editing session, most tiles will be nothing but whitespace, so one pure white tile may be used multiple times for all of those pure white tiles.

The first time the server 302 receives a request for an image 308, it will take the first tile 310, and hash it to determine a big key. Where the server 306 hashes the tile 310 according to the techniques depicted in FIG. 2, the key may comprise the first key and the second key. It will then use the RDP server 304 to send the tile to the RDP client 316, along with an indication of where in the image the tile 310 belongs, and will also store the big key to the tile in the key database 306. The key database may comprise a variety of data structures for storing integers, such as a tree.

For each successive tile 310, the server 302 will determine a big key for it, and then check this against the key database 306. Where there is no match in the key database 306, indicating that a tile representing the same image has not previously been sent to the client 314, the sever 302 will send the tile to the client 314 and store the big key to it in the key database 306, as before. The client receives the tile at the RDP client 316, and caches it in the tile cache 318, along with the big key. The big key may be used as a key to locate the image in the tile cache 318, such as by serving as an index to a hash table.

Where there is a match to this tile in the key database 306, that means that the server 302 has previously sent a tile representing the same image as this tile. So, rather than send the client 314 the tile 310, to save network resources, the server 302 will send the client 314 the corresponding big key, which comprise a smaller amount of data. Where the first key and the second key each comprise 32 bits of data, the big key will comprise 64 bits. The client 314 receives this key and datum at the RDP client 316, and the RDP client 314 uses the big key to locate the corresponding tile in the tile cache 320.

Whether the RDP client 314 received the tile itself or received the corresponding big key and looked up the tile in the tile cache 318, it now has the tile. Along with the tile or the big key, the RDP client 316 will receive an indication of which part of the image 308 the tile 310 comprises. The RDP client 316 will then display the tile 310 in the appropriate part of the image on client display device 320.

Sample Instructions

The following comprises sample pseudo-code in a high level programming language C-type syntax that, when executed on a vector processor will operate on an image in the manner of an embodiment of the present disclosure, similar to as described in the detailed description of FIG. 2.

```
_inline void _fastcall NextCBC64_SSE(
        CBC64Context *pContext,
        UINT32 *pData,
        unsigned NumDWORDBlocks)
{
   UINT32 Checksum;
   register UINT32 Datum;
   register UINT32 Key1;
   register UINT32 Key2;
   UINT32 numQuadBlocks;
   const UINT32 CBC_AB[2] = { CBC_b, CBC_bXORa };
   const UINT32 CBC_CD[2] = { CBC_d, CBC_dXORc };
   if (NumDWORDBlocks != 0) {
      Checksum = pContext->Checksum;
      Datum = pContext->Datum;
      Key1 = pContext->Key1;
      Key2 = pContext->Key2;
      INT iterStart = NumDWORDBlocks % 8;
      if (iterStart) {
         NumDWORDBlocks -= iterStart;
         do {
                    Checksum += *pData;
                    Datum = CBC_RandomOddAlpha * (*pData + Datum)+\
                                                  CBC_RandomBeta;
                    Key1 ^= Datum;
                    Key1 = (Key1 << 1)^(CBC_CD[(Key1&0x80000000) >> 31]);
                    Key2 ^= Datum;
                    Key2 = (Key2 << 1)^(CBC_AB[(Key2&0x80000000) >> 31]);
                  pData++;
                  iterStart--;
         } while (iterStart);
      }
      _m128i xmmRawData;
      _m128i xmmChecksum;
      _m128i xmmDatum;
      _m128i xmmCBC_RandomAlpha;
      _m128i xmmCBC_RandomBeta;
      _m128i xmm1;
      _m128i xmmKey1;
      _m128i xmmKey2;
      xmmChecksum = _mm_set_epi32((int)Checksum, (int)Checksum, (int)Checksum,
(int)Checksum);
         xmmCBC_RandomAlpha = _mm_set_epi32((int)CBC_RandomOddAlpha,
(int)CBC_RandomOddAlpha, (int)CBC_RandomOddAlpha, (int)CBC_RandomOddAlpha);
         xmmCBC_RandomBeta = _mm_set_epi32((int)CBC_RandomBeta,
(int)CBC_RandomBeta, (int)CBC_RandomBeta, (int)CBC_RandomBeta);
         xmmDatum = _mm_setzero_si128( );
         xmmKey1 = _mm_set_epi32((int)Key1, (int)Key1+CBC_RandomOddAlpha,
```

-continued

```
   (int)Key1+CBC_RandomBeta, (int)Key1-CBC_RandomBeta);
      xmmKey2 = _mm_set_epi32((int)Key2, (int)Key2+CBC_RandomOddAlpha,
   (int)Key2+CBC_RandomBeta, (int)Key2-CBC_RandomBeta);
      PUINT32 pDataEnd = pData +numQuadBlocks*8;
      while (pData < pDataEnd) {
         xmmRawData = _mm_load_si128((_m128i*)pData);
         pData += 4;
         xmmChecksum = _mm_add_epi32(xmmRawData, xmmChecksum);
         xmm1 = _mm_add_epi32(xmmRawData, xmmDatum);
         xmm1 = _mm_madd_epi16(xmm1, xmmCBC_RandomAlpha);
         xmmDatum = _mm_add_epi32(xmm1, xmmCBC_RandomBeta);
         xmmKey1 = _mm_xor_si128(xmmKey1, xmmDatum);
         xmmKey2 = _mm_xor_si128(xmmKey2, xmmDatum);
         xmmRawData = _mm_load_si128((_m128i*)pData);
         pData += 4;
         xmmChecksum = _mm_add_epi32(xmmRawData, xmmChecksum);
         xmm1 = _mm_add_epi32(xmmRawData, xmmDatum);
         xmm1 = _mm_madd_epi16(xmm1, xmmCBC_RandomAlpha);
         xmmDatum = _mm_add_epi32(xmm1, xmmCBC_RandomBeta);
         xmmKey1 = _mm_xor_si128(xmmKey1, xmmDatum);
         xmmKey2 = _mm_xor_si128(xmmKey2, xmmDatum);
      }
      PUINT32 pQuadKey1 = (PUINT32)&xmmKey1;
      PUINT32 pQuadKey2 = (PUINT32)&xmmKey2;
      PUINT32 pQuadDatum = (PUINT32)&xmmDatum;
      #define BLEND_QUAD(quad) (quad[0] ^ quad[1] ^ quad[2] ^ quad[3])
      pContext->Checksum = Checksum;
      pContext->Datum = Datum ^ BLEND_QUAD(pQuadDatum) ;
      pContext->Key1 = Key1 ^ BLEND_QUAD(pQuadKey1);
      pContext->Key2 = Key2 ^ BLEND_QUAD(pQuadKey2);
   }
}
```

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A computer-implemented method for classifying an image on a parallel processing system having a bit width corresponding to a number of bits that a processor of the parallel processing system may operate on at a time, the method involving a first random number and a second random number, the first random number differing from the second random number, a datum, a first key, and a second key, comprising:

dividing, by the parallel processing system, the image into two groups each group comprising a number of bits of the image equal to the bit width;

for each group, performing, by the parallel processing system, a hash comprising:

setting a new value of the datum to equal the sum of the value expressed in binary of the group and the current value of the datum multiplied by the first random number and summed with the second random number;

setting a new value of the first key to equal the current value of the first key modified by the datum; and setting a new value of the second key to equal the current value of the second key modified by the datum; and after performing the hash, storing, by the parallel processing system, a big key comprising the first key and the second key in a computer memory.

2. The method of claim 1, further comprising:

sending the image to a client computer across a communications network.

3. The method of claim 2, wherein sending the image to a client computer across a communications network comprises:

sending the image to the client in response to determining that the big key does not match any other big key in the big key store.

4. The method of claim 3, further comprising:

sending the client the big key.

5. The method of claim 4, further comprising:

sending the client computer an indication to use the big key to retrieve a second image from a client hash, and to process the second image as if the client had received it instead of the indication.

6. The method of claim 2, further comprising:

encoding the image before sending the image to the client computer.

7. The method of claim 1, further comprising:
setting each of the datum, the first key and the second key equal to zero before performing operations on each group.

8. The method of claim 1, wherein the first key is modified by the datum by performing an exclusive-or operation on the first key and the datum, and wherein the second key is modified by the datum by performing an exclusive-or operation on the second key and the datum.

9. The method of claim 1, wherein the image has a start and an end, and the operations performed for each group are first performed for the group nearest to the start for which the operations performed for each group have not already been performed.

10. The method of claim 1, further comprising:
in response to determining that the image size divided by the bit width has a remainder number of bits other than zero, hashing the remainder number of bits with a serial cipher block chaining (CBC) algorithm to produce a post-first key and a post-second key, determining the first key based on the post-first key, and determining the second key based on the post-second key.

11. The method of claim 10, wherein the image has an end, and a remainder number of bits that are not part of a group of the at least one group, and wherein the remainder number of bits are located within the image at the end of the image.

12. The method of claim 1, wherein performing the hash comprises:
performing a cipher block chaining (CBC) variant.

13. The method of claim 1, wherein the image comprises a screen scrape.

14. The method of claim 1, wherein the image comprises a tile in a Remote Desktop Protocol (RDP).

15. A system for classifying an image on a parallel processing system having a bit width, the system involving a first random number and a second random number, the first random number differing from the second random number, a datum, a first key and a second key, comprising:
a processor; and
a memory comprising processor-executable instructions that, when executed on the processor, cause the system to at least:
divide the image into two groups, each group comprising a number of bits of the image equal to the bit width;
for each group, perform a hash comprising:
calculating a running reference to the image, the running reference comprising the first key, the second key, and the datum, and calculated based on the running reference, the group, the datum, the first random number and the second random number; and
store a big key comprising the first key and the second in a big key store.

16. The system of claim 15, wherein the memory further bears processor-executable instructions that, when executed on the processor, cause the system to at least:
encode the image; and
send the encoded image to a client across a communications network according to a remote desktop protocol (RDP).

17. The system of claim 15, wherein a pixel of the image comprises 32 bits, the bit width comprises 128 bits.

18. The system of claim 17, wherein the memory further bears processor-executable instructions that, when executed on the processor, cause the system to at least:
determine that the image is unaligned before dividing the image, and hashing a portion of the image that occurs before the first alignment boundary with a serial algorithm to produce a pre-first key and a pre-second key; and
combine the pre-first key with the first key and the pre-second key with the second key.

19. The system of claim 15, wherein the big key is stored in the big key store when the big key does not match any other big key in the big key store.

20. A computer-readable storage device bearing computer-executable instructions that, when executed by a parallel processing system having a bit width corresponding to a number of bits that a processor of the parallel processing system may operate on at a time, a first random number and a second random number, the first random number differing from the second random number, a datum, a first key, and a second key, comprising, cause the parallel processing system to perform operations comprising:
dividing the image into two groups, each group comprising a number of bits of the image equal to the bit width;
for each group, performing a hash comprising:
setting a new value of the datum to equal the sum of the value expressed in binary of the group and the current value of the datum multiplied by the first random number and summed with the second random number;
setting a new value of the first key to equal the current value of the first key modified by the datum; and
setting a new value of the second key to equal the current value of the second key modified by the datum; and
after performing the hash, storing a big key comprising the first key and the second key in a computer memory.

* * * * *